US009798547B2

(12) United States Patent
Nomoto et al.

(10) Patent No.: US 9,798,547 B2
(45) Date of Patent: Oct. 24, 2017

(54) VLIW PROCESSOR INCLUDING A STATE REGISTER FOR INTER-SLOT DATA TRANSFER AND EXTENDED BITS OPERATIONS

(71) Applicant: MegaChips Corporation, Osaka-shi (JP)

(72) Inventors: Shohei Nomoto, Osaka (JP); Yusuke Mizuno, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 240 days.

(21) Appl. No.: 14/660,057

(22) Filed: Mar. 17, 2015

(65) Prior Publication Data

US 2015/0277909 A1    Oct. 1, 2015

(30) Foreign Application Priority Data

Mar. 26, 2014 (JP) ................. 2014-063125

(51) Int. Cl.
*G06F 9/30* (2006.01)
*G06F 15/76* (2006.01)
(Continued)

(52) U.S. Cl.
CPC .......... *G06F 9/3826* (2013.01); *G06F 9/3001* (2013.01); *G06F 9/3012* (2013.01);
(Continued)

(58) Field of Classification Search
CPC .... G06F 9/3001; G06F 9/3826; G06F 9/3853; G06F 15/76
See application file for complete search history.

(56) References Cited

U.S. PATENT DOCUMENTS 4,238,833 A * 12/1980 Ghest .................... G06F 7/5338
708/628
2003/0137518 A1    7/2003 Hiwada et al.
(Continued)

FOREIGN PATENT DOCUMENTS

CN    101324839 A    12/2008
JP    2003-216943    7/2003

OTHER PUBLICATIONS

Combined Office Action and Search Report issued Feb. 21, 2017 in Chinese Patent Application No. 201510010671.0 (with English translation).

*Primary Examiner* — David J Huisman
(74) *Attorney, Agent, or Firm* — Oblon, McClelland, Maier & Neustadt, L.L.P.

(57) ABSTRACT

A very long instruction word (VLIW) processor that performs efficient processing including extended bits operations is provided. The VLIW processor includes an instruction control unit, a register file unit, and an instruction execution unit. The instruction execution unit includes a plurality of slots, and a state register arranged between the second slot and the third slot to transfer N-bit data between the second and third slots. The VLIW processor stores data output from the third slot into the state register and uses the data, and thus achieves efficient processing including bit-expanded operations, such as processing performed in response to instructions commonly used in image processing, image recognition, and other processing, while preventing scaling up of the circuit.

12 Claims, 13 Drawing Sheets

(51) Int. Cl.
*G06F 9/38* (2006.01)
*G06F 15/82* (2006.01)

(52) U.S. Cl.
CPC .......... *G06F 9/3824* (2013.01); *G06F 9/3836* (2013.01); *G06F 9/3853* (2013.01); *G06F 9/3889* (2013.01); *G06F 15/76* (2013.01); *G06F 15/82* (2013.01)

(56) References Cited

U.S. PATENT DOCUMENTS

| | | | | |
|---|---|---|---|---|
| 2006/0224652 | A1* | 10/2006 | Rounioja | G06F 9/30014 708/404 |
| 2008/0313429 | A1* | 12/2008 | Morikawa | G06F 9/3001 712/34 |
| 2014/0006755 | A1* | 1/2014 | Gueron | G06F 9/3001 712/222 |
| 2015/0081753 | A1* | 3/2015 | Iyer | G06F 7/525 708/523 |

* cited by examiner

VLIW PROCESSOR INCLUDING A STATE REGISTER FOR INTER-SLOT DATA TRANSFER AND EXTENDED BITS OPERATIONS

This application claims priority to Japanese Patent Application No. 2014-063125, filed on Mar. 26, 2014, the entire disclosure of which is hereby incorporated herein by reference (IBR).

BACKGROUND OF THE INVENTION

Field of the Invention

The present invention relates to a processor with a very long instruction word (VLIW) architecture (VLIW processor).

Description of the Background Art

Various processor techniques have been developed to perform efficient arithmetic processing of large-volume data, such as image data.

For example, Patent Literature 1 (Japanese Unexamined Patent Application Publication No. 2003-216943) describes an image processor for processing graphics. The image processor includes a load-store unit, multiple operation units, and a switching channel arranged between the operation units to allow an operation result from one operation unit to enter another operation unit.

Processors known in the art mainly perform operations in 8 bits or 16 bits in image processing and image recognition. The recent trend toward more sophisticated and more complex image processing and image recognition has increased the use of operations in 32 bits in processors that perform image processing, image recognition, and other processing.

This raises the need for processors that can perform operations in 32 bits (VLIW processors) in addition to operations in 8 bits or 16 bits.

For example, a processor capable of performing operations in 32 bits in addition to 16 bits with the technique described in Patent Literature 1 may have the configuration shown in FIG. 13.

FIG. 13 is a schematic block diagram of a processor 900 capable of performing operations in 32 bits with a technique known in the art.

As shown in FIG. 13, the processor 900 includes an instruction control unit 91, a switch channel 92, an instruction execution unit 93, an instruction memory, M91, and a data memory M92. The switch channel 92 transmits data to the instruction execution unit 93 through data paths Di90, Di91, Di92, Di93, Di94, Di95, Di96 and Di97, receives data from instruction execution unit 93 through data paths through Do91, Do92, Do93, Do94, and Do95, and receives control signal Ctl91 from the instruction control unit 91. The instruction execution unit 93 receives control signal Ctl92 from the instruction control unit 91.

The instruction control unit 91 fetches an instruction from the instruction memory M91 (instruction fetching) and decodes the instruction (instruction decoding). The instruction control unit 91 controls the switch channel 92 and the instruction execution unit 93 in accordance with the result of the instruction decoding.

To execute a plurality of instructions in parallel in one cycle (one clock cycle), the instruction execution unit 93 includes a plurality of instruction slots that can perform operations in parallel in one cycle. As shown in FIG. 13, the instruction execution unit 93 includes three slots, which are a first slot 931, a second slot 932, and a third slot 933.

The first slot 931 includes a load-store unit, which loads or stores data from or into the data memory M92.

The second slot 932 includes an adder unit that performs 32-bit operations (unit indicated by Add32 in FIG. 13), an arithmetic logic unit (ALU) that performs 16-bit operations (unit indicated by Logic16 in FIG. 13), and an arithmetic shifting unit that performs 32-bit operations (unit indicated by Shift32 in FIG. 13).

The third slot 933 includes an adder unit that performs 16-bit operations (unit indicated by Add16 in FIG. 13), an ALU that performs 16-bit operations (unit indicated by Logic16 in FIG. 13), and a multiplier unit that performs 16-bit operations (unit indicated by Mul16 in FIG. 13).

The instruction memory M91 stores instructions and other information used for operations performed by the processor 900.

The data memory M92 is a storage unit that can store data used for operations performed by the processor 900.

As shown in FIG. 13, the processor 900 includes the unit that performs 32-bit operations in the second slot 932. The processor 900 thus transmits two sets of 32-bit data from the switch channel 92 to the second slot 932. For example, the adder unit Add16 needs two 32-bit data sets when performing an addition operation of 32-bit data. The processor 900 uses four paths for transferring 16-bit data (data paths Di92 to Di95) between the switch channel 92 and the second slot 932 as shown in FIG. 13. In other words, the processor 900 needs data paths corresponding to 64 bits between the switch channel 92 and the second slot 932.

When a 32-bit operation is performed in the second slot 932, the resultant output will be 32-bit data. Transmitting this output from the second slot 932 to the switch channel 92 needs data paths corresponding to 32 bits. In FIG. 13, data paths Do92 and Do93, each of which can transfer 16-bit data, are used to transmit 32-bit data from the second slot 932 to the switch channel 92.

The processor 900 includes the multiplier unit Mul16 in the third slot 933. The multiplier unit Mul 6 performs multiplication of 16-bit data and outputs 32-bit data. The processor 900 thus needs data paths corresponding to 32 bits to transmit the output result from the third slot 933 to the switch channel 92. In FIG. 13, data paths Do94 and Do95, each of which can transfer 16-bit data, are used to transmit 32-bit data from the third slot 933 to the switch channel 92.

The processor 900 using the technique known in the art to perform 32-bit operations would need more input and output ports between the switch channel 92 and the instruction execution unit 93. This increases the circuit scale. Although the switch channel 92 may be replaced by a general-purpose register file, this configuration also needs more input and output ports provided between the general-purpose register file and the instruction execution unit 93. This also increases the circuit scale.

In response to the above problems, it is an object of the present invention to provide a VLIW processor that performs efficient processing including extended bits operations, such as instructions commonly used in image processing, image recognition, and other processing, while preventing scaling up of the circuit.

SUMMARY

In response to the above problems, a first aspect of the invention provides a VLIW processor including a register file unit and an instruction execution unit.

The instruction execution unit includes a first slot, and a state register that stores data of N bits (N is a natural number).

The first slot includes an input port that receives data of N×2 bits output from the register file unit (N is a natural number), a first output port that outputs data of N bits to the register file unit, and a second output port that outputs data of N bits to the state register. The first slot further includes a first-slot first extended arithmetic unit that performs arithmetic processing using N-bit data and obtain 2×N-bit output data.

The first slot outputs first data that is N-bit data of the 2×N-bit output data obtained by the first-slot first extended arithmetic unit from the first output port to the register file unit, and outputs second data that is N-bit data of the 2×N-bit output data excluding the first data to the state register.

DESCRIPTION OF THE PREFERRED EMBODIMENTS

First Embodiment

A first embodiment will now be described with reference to the drawings.

1.1 VLIW Processor Configuration

Figure 1:
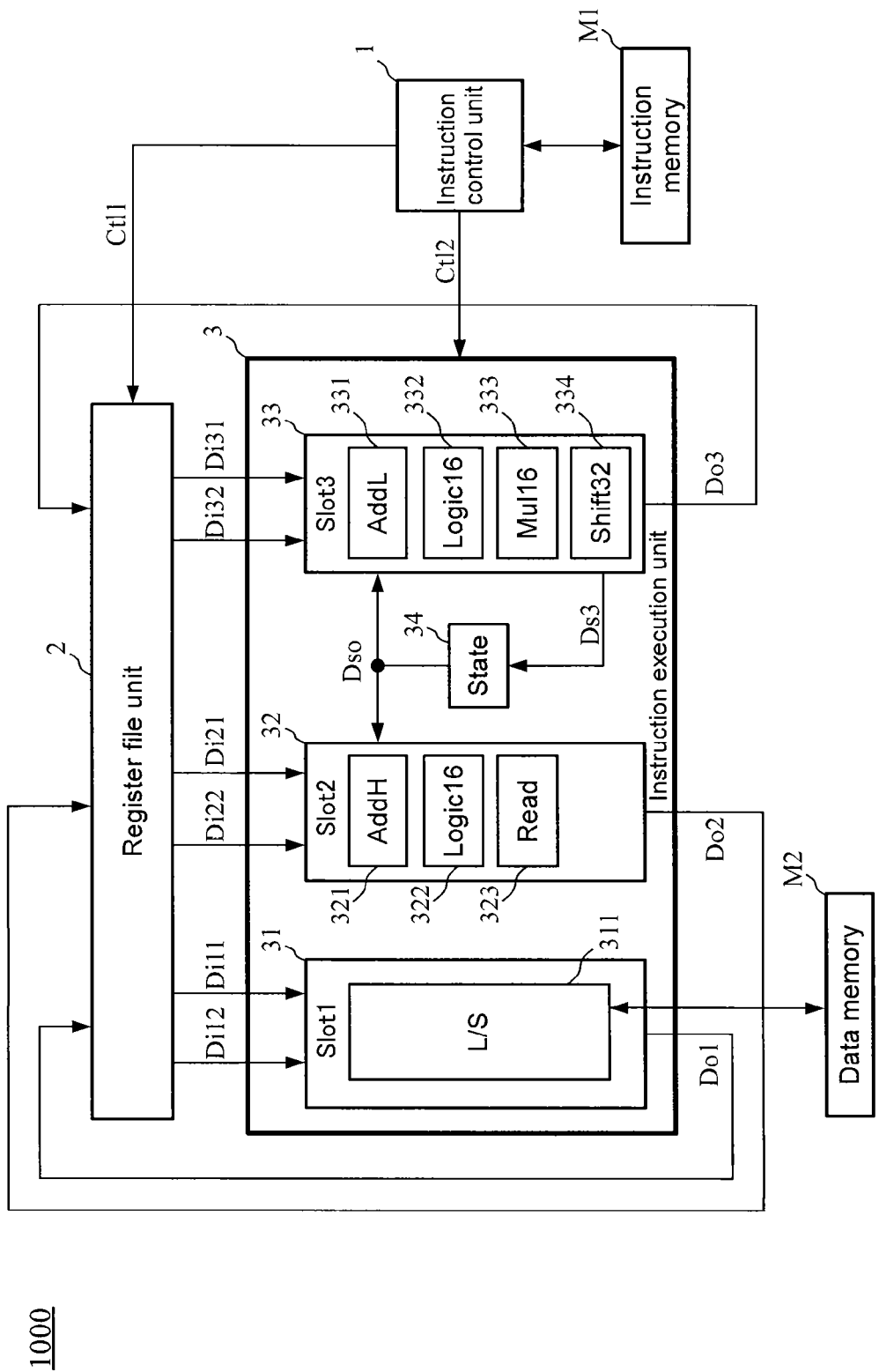
FIG. 1 is a schematic block diagram of a VLIW processor 1000 according to a first embodiment.

FIG. 1 is a schematic block diagram of a VLIW processor 1000 according to the first embodiment.

The VLIW processor 1000 performs N-bit operations (N is a natural number) and 2×N-bit operations.

In the example described below, N=16, or more specifically, the VLIW processor 1000 is capable of performing 16-bit operations and 32-bit operations.

As shown in FIG. 1, the VLIW processor 1000 includes an instruction control unit 1, a register file unit 2, an instruction execution unit 3, an instruction memory M1, and a data memory M2.

The instruction control unit 1 fetches an instruction from the instruction memory M1 (instruction fetching) and decodes the instruction (instruction decoding). The instruction control unit 1 then generates a control signal Ctl1 for controlling the register file unit 2 in accordance with the result of the instruction decoding, and outputs the generated control signal Ctl1 to the register file unit 2.

The instruction control unit 1 also generates a control signal Ctl2 for controlling the instruction execution unit 3 in accordance with the result of the instruction decoding, and outputs the generated control signal Ctl2 to the instruction execution unit 3.

The register file unit 2 includes a plurality of registers. The register file unit 2 outputs data stored in a predetermined register to its corresponding predetermined slot in the instruction execution unit 3 in accordance with the control signal Ctl1 from the instruction control unit 1 through data paths Di11, Di12, Di21, Di22, Di31, and Di32, as shown in FIG. 1. The register file unit 2 also controls input of data into a predetermined register from the instruction execution unit 3 in accordance with the control signal Ctl1 through data paths Do1, Do2, and Do3.

The instruction execution unit 3 includes a plurality of instruction slots that can perform operations in parallel in one cycle to allow a plurality of instructions to be executed in one cycle (one clock cycle). For ease of explanation, the instruction execution unit 3 in this example includes three instruction slots.

The instruction execution unit 3 includes three slots, namely, a first slot 31, a second slot 32, and a third slot 33 as shown in FIG. 1. The instruction execution unit 3 also includes a state register 34.

The first slot 31 includes a load-store unit 311, which loads or stores 16-bit data from or into the data memory M2.

The second slot 32 includes an adder unit 321, which performs addition of 16-bit data, an ALU 322, which performs a logic operation of 16-bit data, and a state read unit 323, which reads 16-bit data from the state register 34. The addition may include subtraction. In other words, the addition may include both addition and subtraction (the same applies hereafter).

The third slot 33 includes an adder unit 331, which performs addition of 16-bit data, an ALU 332, which performs a logic operation of 16-bit data, a multiplier unit 333, which performs multiplication of 16-bit data, and an arithmetic shifting unit 334, which performs bit shifting of 32-bit data.

The state register 34 receives 16-bit data output from the third slot 33, and stores the 16-bit data. The state register 34 outputs the internal 16-bit data to the second slot 32 and the third slot 33.

The configuration (one example) of the instruction execution unit 3 will now be described with reference to FIG. 2.

Figure 2:
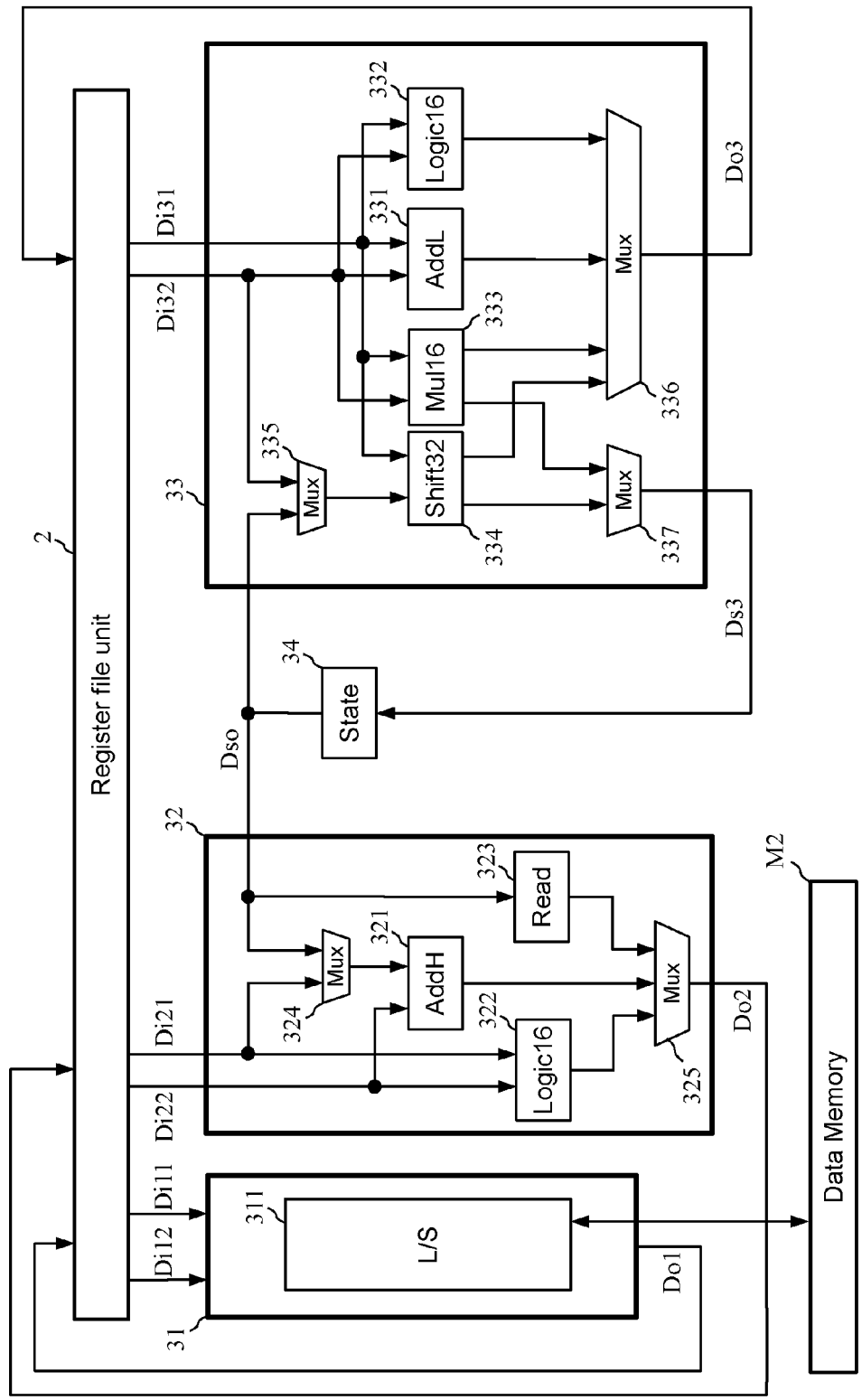
FIG. 2 is a schematic view of the configuration (one example) of an instruction execution unit 3.

FIG. 2 is a schematic view of the configuration (one example) of the instruction execution unit 3.

As shown in FIG. 2, the second slot 32 of the instruction execution unit 3 includes an adder unit 321, an ALU 322, a state read unit 323, a first switch unit 324, and a second switch unit 325.

The first switch unit 324 receives 16-bit data Di21 output from the register file unit 2 and 16-bit data Dso output from the state register 34. The first switch unit 324 outputs the 16-bit data Di21 or the 16-bit data Dso to the adder unit 321 in accordance with a command (a control signal Ctl2) from the instruction control unit 1.

The adder unit 321 receives 16-bit data Di22 output from the register file unit 2 and 16-bit data output from the first switch unit 324, and adds up the two 16-bit data sets. The adder unit 321 then outputs the resultant data to the second switch unit 325.

When using the upper 16 bits in the 32-bit addition, the adder unit 321 receives the 16-bit data Di22, the 16-bit data output from the first switch unit 324, and, for example, a carry flag (a carry bit, which is 1-bit data) generated by the adder unit 331 in the third slot and stored in a carry register (not shown) included in the register file unit 2, and performs addition using the three data sets. The adder unit 321 then outputs the resultant data to the second switch unit 325.

The ALU 322 receives the 16-bit data Di21 and the 16-bit data Di22 output from the register file unit 2, and subjects the input two 16-bit data sets to predetermined arithmetic logic processing. The ALU 322 then outputs the resultant data to the second switch unit 325.

The state read unit 323 reads 16-bit data stored in the state register 34. The state read unit 323 outputs the data read from the state register 34 to the second switch unit 325.

The second switch unit 325 receives the output from the adder unit 321, the output from the ALU 322, and the output from the state read unit 323. In accordance with a command (a control signal Ctl2) from the instruction control unit 1, the second switch unit 325 outputs one of the outputs from the adder unit 321, the ALU 322, and the state read unit 323 to the register file unit 2 as data Do2. When selecting the output from the adder unit 321 and outputting it to the register file unit 2, the second switch unit 325 may include a carry flag resulting from the addition operation in the data Do2 output to the register file unit 2, or may output the carry flag to the register file unit 2 using another path.

As shown in FIG. 2, the third slot 33 of the instruction execution unit 3 includes an adder unit 331, an ALU 332, a multiplier unit 333, an arithmetic shifting unit 334, a third switch unit 335, a fourth switch unit 336, and a fifth switch unit 337.

The third switch unit 335 receives 16-bit data Di32 output from the register file unit 2 and 16-bit data Dso output from the state register 34. The third switch unit 335 outputs the 16-bit data Di32 or the 16-bit data Dso to the arithmetic shifting unit 334 in accordance with a command (a control signal Ctl2) from the instruction control unit 1.

The adder unit 331 uses the 16-bit data Di31 and the 16-bit data Di32 output from the register file unit 2, and performs addition of the input two 16-bit data sets. The adder unit 331 then outputs the resultant data to the fourth switch unit 336.

When performing addition using the lower 16 bits in the 32-bit addition, the adder unit 331 outputs a carry flag (a carry bit, which is 1-bit data) resulting from the addition of the 16-bit data Di31 and the 16-bit data Di32 to the register file unit 2 to store the data in, for example, the carry register of the register file unit 2 (the output path is not shown).

The ALU 332 receives the 16-bit data Di31 and the 16-bit data Di32 output from the register file unit 2, and subjects the input two data sets to predetermined arithmetic logic processing. The ALU 332 then outputs the resultant data to the fourth switch unit 336.

The multiplier unit 333 receives the 16-bit data Di31 and the 16-bit data Di32 output from the register file unit 2 and performs multiplication of the two data sets. Of the 32-bit data resulting from the multiplication, the multiplier unit 333 then outputs the lower 16-bit data to the fourth switch unit 336 and the upper 16-bit data to the fifth switch unit 337.

The arithmetic shifting unit 334 receives the 16-bit data Di31 output from the register file unit 2 and the 16-bit data output from the third switch unit 335, and performs arithmetic shifting (32-bit arithmetic shifting) of the input two data sets. Of the 32-bit data resulting from the arithmetic shifting, the arithmetic shifting unit 334 outputs the lower 16-bit data to the fourth switch unit 336 and the upper 16-bit data to the fifth switch unit 337.

The fourth switch unit 336 receives the output from the adder unit 331, the output from the ALU 332, the lower 16-bit data of the data resulting from the multiplication output from the multiplier unit 333, and the lower 16-bit data of the data resulting from the arithmetic shifting output from the arithmetic shifting unit 334. In accordance with a command (a control signal Ctl2) from the instruction control unit 1, the fourth switch unit 336 selects one of the outputs from the above four units and outputs the selected data to the register file unit 2 as data Do3.

The fourth switch unit 336 may include a carry flag resulting from the addition performed by the adder unit 331 into the data Do3 and output the data Do3 including the carry flag, or may output the carry flag to the register file unit 2 using another path.

The fifth switch unit 337 receives the upper 16-bit data of the data resulting from the multiplication output from the multiplier unit 333 and the upper 16-bit data of the data resulting from the arithmetic shifting output from the arithmetic shifting unit 334. In accordance with a command (a control signal Ctl2) from the instruction control unit 1, the fifth switch unit 337 selects one of the outputs from the above two units and outputs the selected data to the state register 34 as data Ds3.

The state register 34 receives the 16-bit data output from the fifth switch unit 337 in the third slot 33 and stores the input 16-bit data. The state register 34 outputs the stored 16-bit data to the state read unit 323 and the first switch unit 324 in the second slot 32 and to the third switch unit 335 in the third slot 33.

The instruction memory M1 is a storage device for storing instructions enabling operations in the VLIW processor 1000. The instruction memory M1 is accessible by the instruction control unit 1.

The data memory M2 is a storage device for storing data enabling operations in the VLIW processor 1000. The data memory M2 is accessible by the load-store unit 311 in the first slot 31 of the instruction execution unit 3.

The instruction memory M1 and the data memory M2 may be formed using a single memory (storage device).

1.2 Operation of VLIW Processor

The operation of the VLIW processor 1000 with the above configuration will now be described hereafter with reference to the drawings.

The processing performed by the VLIW processor 1000 below will now be described.

(1) Multiplication and then arithmetic shifting of the multiplication result (MulShift)

(2) Multiplication and then addition of the multiplication result (MulAdd)

(3) Multiplication and then arithmetic shifting of the multiplication result, and then addition of the shifting result (MulShiftAdd)

(4) Arithmetic shifting and then addition of the shifting result (ShiftAdd)

1.2.1 MulShift Processing

The VLIW processor 1000 multiplies two 16-bit data sets together and then shifts the resultant 32-bit data through 32-bit shifting (MulShift processing). This processing will now be described.

Figure 3:
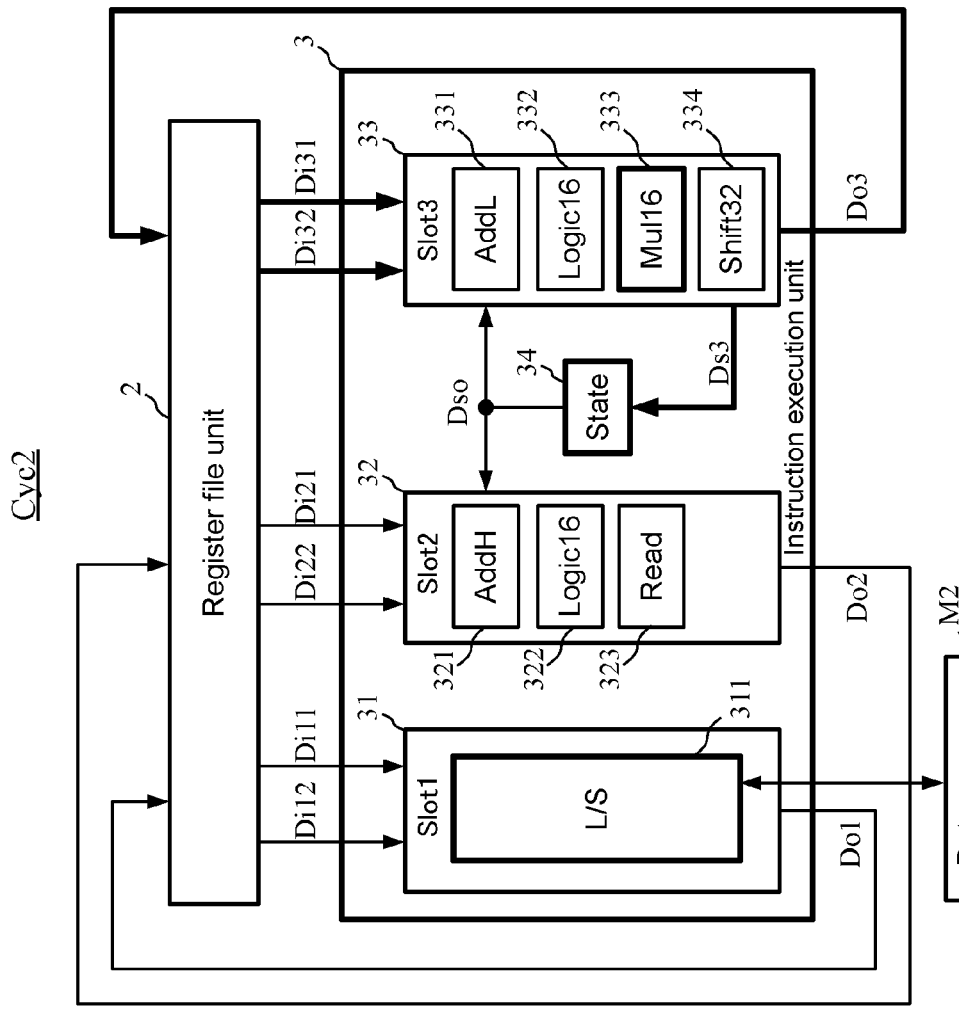
FIG. 3 is a diagram showing arithmetic processing allocated to each slot in MulShift processing, in which active elements of the VLIW processor 1000 in cycle 2 are emphasized.

The left portion of FIG. 3 shows arithmetic processing allocated to the slots (the first slot 31, the second slot 32, and the third slot 33) in each cycle in the MulShift processing performed by the VLIW processor 1000. In the right portion of FIG. 3, active elements in cycle 2 (Cyc2) are emphasized in bold (the same applies hereafter).

Figure 4:
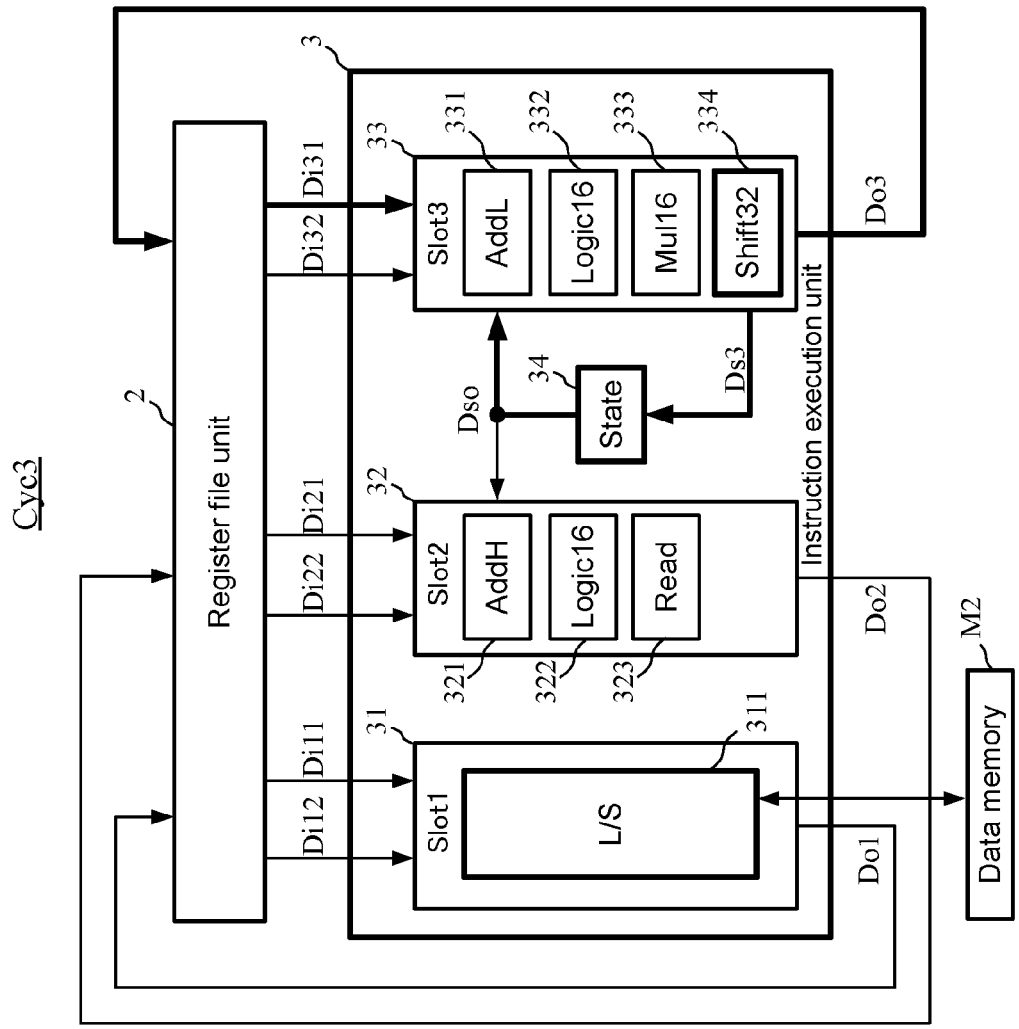
FIG. 4 is a diagram showing arithmetic processing allocated to each slot in MulShift processing, in which active elements of the VLIW processor 1000 in cycle 3 are emphasized.
Figure 5:
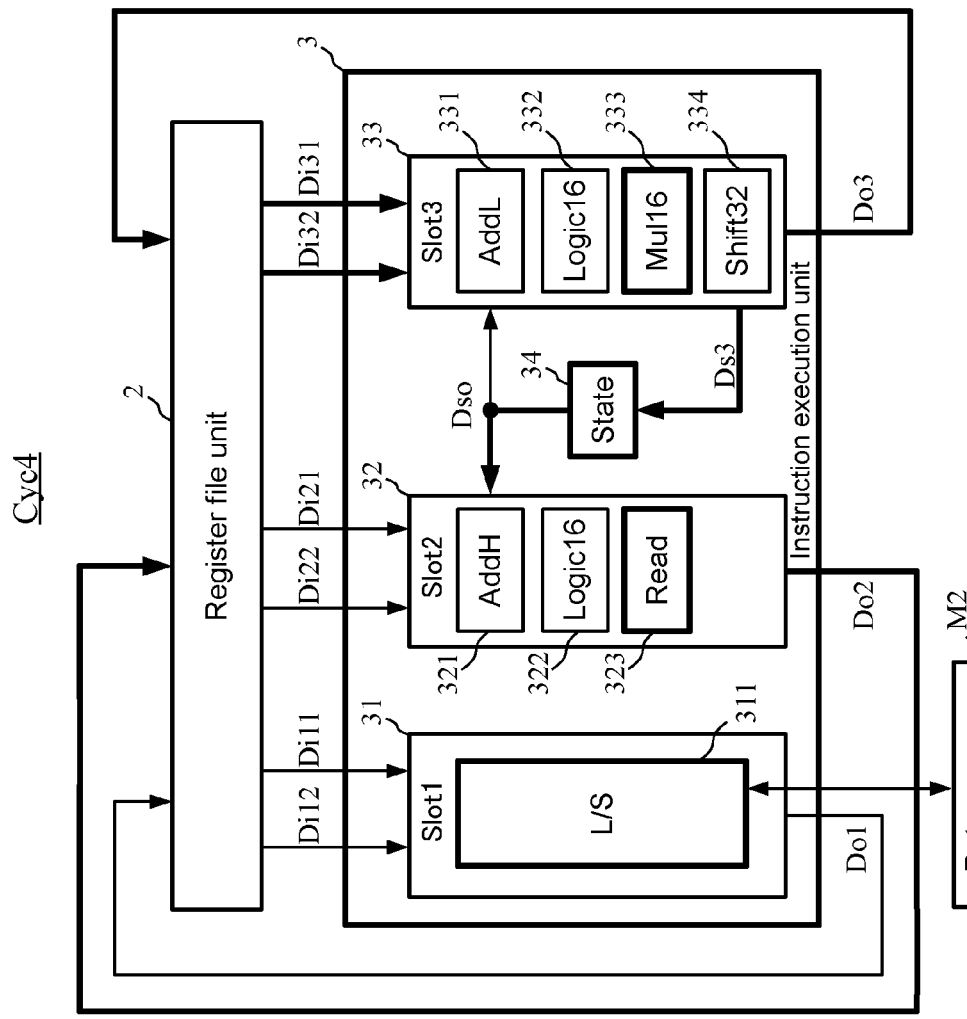
FIG. 5 is a diagram showing arithmetic processing allocated to each slot in MulShift processing, in which active elements of the VLIW processor 1000 in cycle 4 are emphasized.

FIGS. 4 and 5 are basically the same as FIG. 3.

In the right portion of FIG. 4, active elements in cycle 3 (Cyc3) are emphasized.

In the right portion of FIG. 5, active elements in cycle 4 (Cyc4) are emphasized.

The MulShift processing corresponds to, for example, multiplying two 16-bit data sets together and aligning the fixed decimal point positions.

Cyc0:

In cycle 0 (Cyc0), the instruction control unit 1 provides a load-store instruction based on the control signal Ctl2 to the instruction execution unit 3. In accordance with the load-store instruction, the load-store unit 311 in the first slot 31 reads one of two 16-bit data sets (source operands) to be used for multiplication (Mul16) performed by the multiplier unit 333 in the third slot 33 from the data memory M2. The first slot 31 then outputs the read 16-bit data to the register file unit 2.

The register file unit 2 stores the 16-bit data read from the first slot 31 into a predetermined register.

Cyc1:

In cycle 1 (Cyc1), the instruction control unit 1 provides a load-store instruction based on the control signal Ctl2 to the instruction execution unit 3. In accordance with the load-store instruction, the load-store unit 311 in the first slot 31 reads the other of the two 16-bit data sets (source operands) to be used for multiplication (Mul16) performed by the multiplier unit 333 in the third slot 33 from the data memory M2. The first slot 31 then outputs the read 16-bit data to the register file unit 2.

The register file unit 2 stores the 16-bit data read from the first slot 31 into a predetermined register.

Cyc2:

In cycle 2 (Cyc2), the instruction control unit 1 provides a multiplication instruction based on the control signal Ctl2 to the instruction execution unit 3. This instruction activates the multiplier unit 333 in the third slot 33. In accordance with the control signal Ctl2 from the instruction control unit 1, the register file unit 2 also outputs two 16-bit data sets to be processed stored in the predetermined registers in cycles 0 and 1 to the third slot 33 through the data paths Di31 and Di32.

The multiplier unit 333 in the third slot 33 multiplies the two 16-bit data sets input through the data paths Di31 and Di32. The multiplier unit 333 outputs the upper 16-bit data of the resultant 32-bit data to the state register 34 as 16-bit data Ds3 through the fifth switch unit 337. The state register 34 stores the 16-bit data Ds3 output from the third slot 33.

The multiplier unit 333 also outputs the lower 16-bit data of the 32-bit data resulting from the multiplication to the register file unit 2 as 16-bit data Do3 through the fourth switch unit 336. The register file unit 2 stores the received 16-bit data Do3 into a predetermined register.

Cyc3:

In cycle 3 (Cyc3), the instruction control unit 1 provides an arithmetic shifting instruction based on the control signal Ctl2 to the instruction execution unit 3. This instruction activates the arithmetic shifting unit 334 in the third slot 33. In accordance with the control signal Ctl2 from the instruction control unit 1, the register file unit 2 also outputs the operation target 16-bit data stored in the predetermined register (the lower 16-bit data of the multiplication result) in cycle 2 to the third slot 33 through the data path Di31.

The arithmetic shifting unit 334 receives the 16-bit data input from the register file unit 2 through the data path Di31 and the 16-bit data (the upper 16-bit data of the multiplication result) output from the state register 34. The third switch unit 335 selects the output from the state register 34 in accordance with an instruction from the instruction control unit 1, and outputs the selected data to the arithmetic shifting unit 334.

The arithmetic shifting unit 334 performs arithmetic shifting of the 32-bit data including the input two 16-bit data sets. The arithmetic shifting unit 334 outputs the upper 16-bit data of the 32-bit data resulting from the arithmetic shifting to the state register 34 as 16-bit data Ds3 through the fifth switch unit 337. The state register 34 then stores the 16-bit data Ds3 output from the third slot 33.

The arithmetic shifting unit 334 also outputs the lower 16-bit data of the 32-bit data resulting from the arithmetic shifting to the register file unit 2 as 16-bit data Do3 through the fourth switch unit 336. The register file unit 2 stores the received 16-bit data Do3 into a predetermined register.

Cyc4:

In cycle 4 (Cyc4), the instruction control unit 1 provides a read instruction based on the control signal Ctl2 to the instruction execution unit 3. This instruction activates the state read unit 323 in the second slot 32. The state read unit 323 outputs the upper 16-bit data of the arithmetic shifting result in cycle 3 to the register file unit 2 as 16-bit data Do2 through the second switch unit 325. The second switch unit 325 is controlled to select the output from the state read unit 323 in accordance with the control signal Ctl2 and output the signal.

The register file unit 2 stores the received 16-bit data Do2 into a predetermined register.

The same multiplication as described above is performed on other data (multiplication performed by the multiplier unit 333 in the third slot). As shown in the right portion of FIG. 5, two 16-bit data sets for this multiplication are read from the data memory M2 by the load-store unit 311 in the first slot 31 in cycles 2 and 3, and are stored into a predetermined register of the register file unit 2.

As described above, the VLIW processor 1000 multiplies the two 16-bit data sets together, and shifts the resultant 32-bit data through 32-bit shifting (MulShift processing).

1.2.2 MulAdd Processing

The VLIW processor 1000 multiplies two 16-bit data sets together and then adds the resultant 32-bit data to other 32-bit data (MulAdd processing). This processing will now be described with reference to FIGS. 6 and 7. An example of the MulAdd processing is cumulative addition of the multiplication result of two 16-bit data sets. Such processing is commonly used in image processing, image recognition, and other processing.

Figure 6:
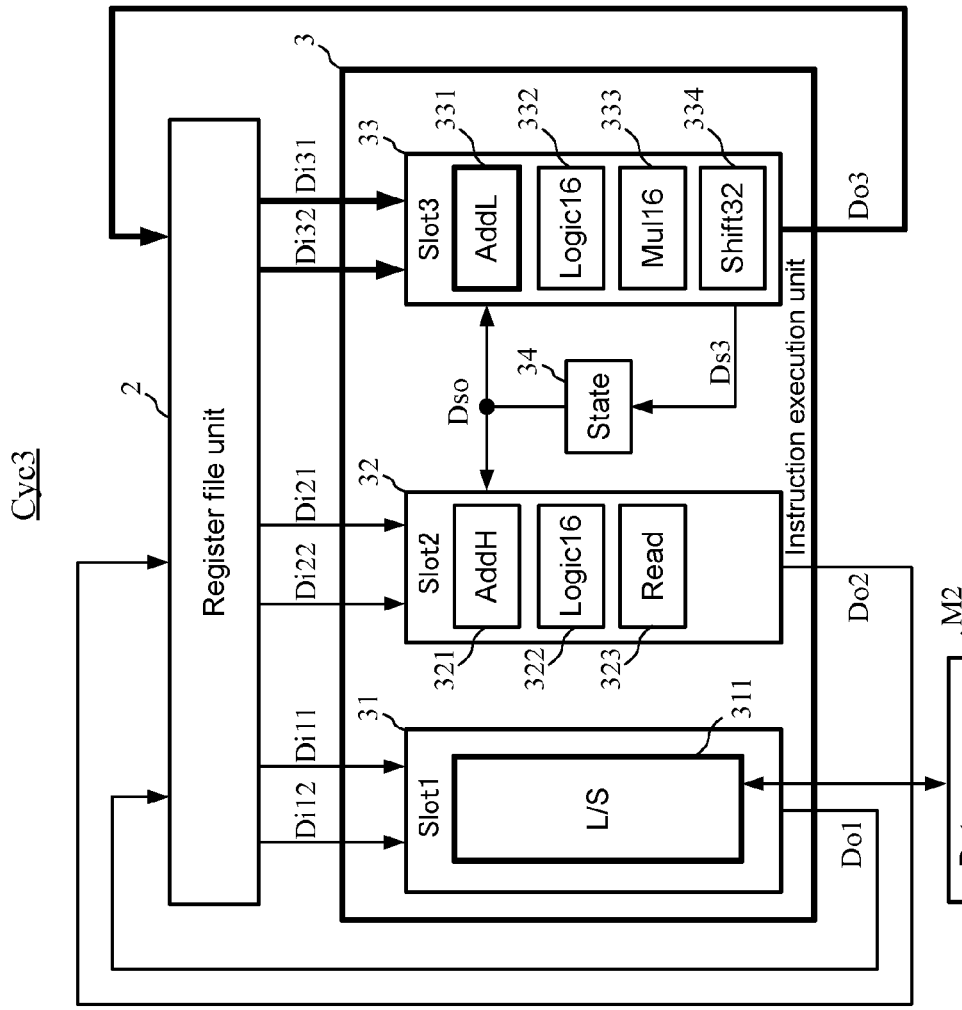
FIG. 6 is a diagram showing arithmetic processing allocated to each slot in MulAdd processing, in which active elements of the VLIW processor 1000 in cycle 3 are emphasized.

The left portion of FIG. 6 shows arithmetic processing allocated to the slots (the first slot 31, the second slot 32, and the third slot 33) in each cycle in the MulAdd processing performed by the VLIW processor 1000. In the right portion of FIG. 6, active elements in cycle 3 (Cyc3) are emphasized.

Figure 7:
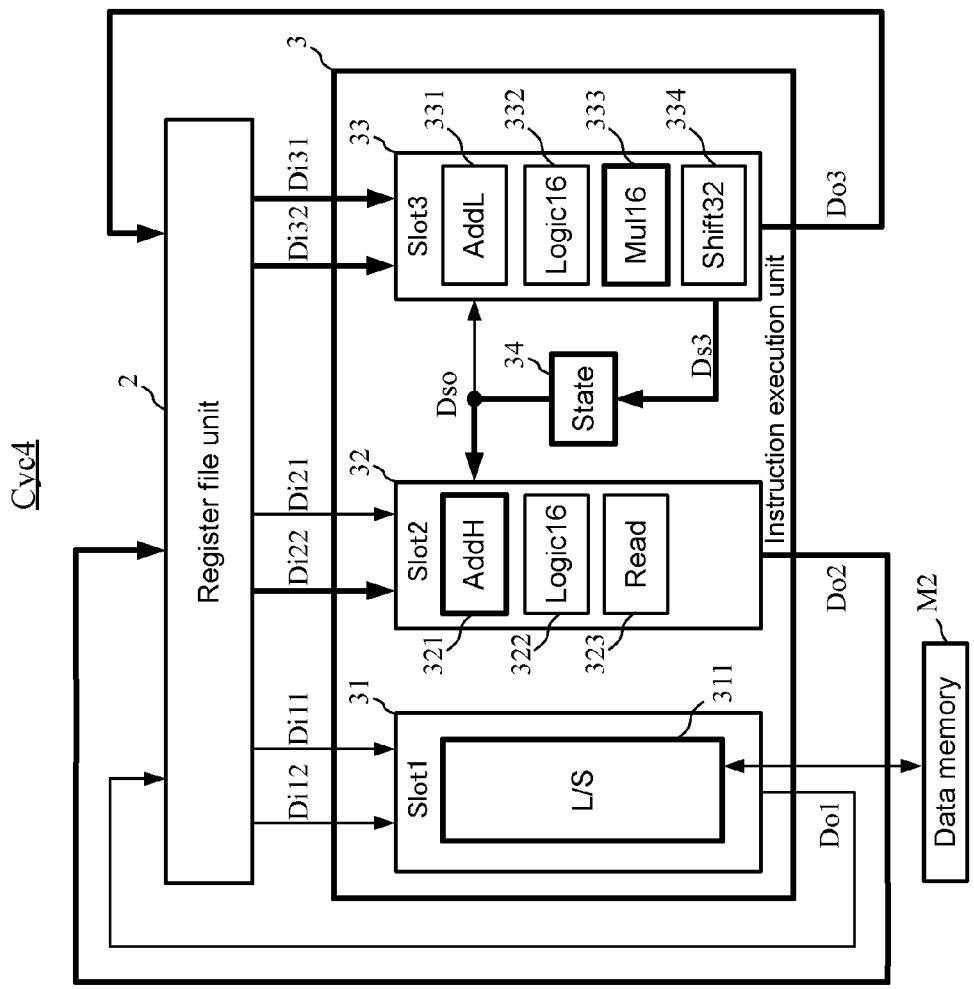
FIG. 7 is a diagram showing arithmetic processing allocated to each slot in MulAdd processing, in which active elements of the VLIW processor 1000 in cycle 4 are emphasized.

FIG. 7 is basically the same as FIG. 6.

In the right portion of FIG. 7, active elements in cycle 4 (Cyc4) are emphasized.

Cyc0 to Cyc2:

The processing in cycles 0 to 2 (Cyc0 to Cyc2) is the same as the processing in cycles 0 to 2 described above in "1.2.1 MulShift processing", and will not be described in detail.

Cyc3:

In cycle 3 (Cyc3), the instruction control unit 1 provides an addition instruction (AddL instruction) based on the control signal Ctl2 to the instruction execution unit 3. This instruction activates the adder unit 331 in the third slot 33. In accordance with the control signal Ctl2 from the instruction control unit 1, the register file unit 2 also outputs the lower 16-bit data of the multiplication result stored in the predetermined register in cycle 2 to the third slot 33 through the data path Di31. In accordance with the control signal Ctl2 from the instruction control unit 1, the register file unit 2 outputs the lower 16-bit data of 32-bit data to be added (e.g., a cumulative addition value, which is 32-bit data) to the third slot 33 through the data path Di32.

The adder unit 331 in the third slot 33 adds up the two 16-bit data sets input through the data paths Di31 and Di32. The adder unit 331 then outputs 16-bit data of the resultant data to the register file unit 2 as 16-bit data Do3. The register file unit 2 stores the received 16-bit data Do3 into a predetermined register. A carry bit resulting from the addition in the adder unit 331 is also output to the register file unit 2 and is stored into a predetermined register (e.g., a carry register). A data path for the carry bit is not shown.

Cyc4:

In cycle 4 (Cyc4), the instruction control unit 1 provides an addition instruction (AddH instruction) based on the control signal Ctl2 to the instruction execution unit 3. This instruction activates the adder unit 321 in the second slot 32. In accordance with the control signal Ctl2 from the instruction control unit 1, the register file unit 2 also outputs the upper 16-bit data of 32-bit data to be added (e.g., a cumulative addition value, which is 32-bit data) to the second slot 32 through the data path Di22.

The state register 34 outputs the multiplication result stored in cycle 2 (the upper 16-bit data of the multiplication result obtained by the multiplier unit 333) to the adder unit 321 through the first switch unit 324. In accordance with the control signal Ctl2, the first switch unit 324 controls the output from the state register 34 to be provided to the adder unit 321.

The adder unit 321 in the second slot 32 adds up the 16-bit data input through the data path Di22, the 16-bit data output from the first switch unit 324 (the upper 16-bit data of the multiplication result obtained by the multiplier unit 333), and the carry bit resulting from the addition in the adder unit 331 (the data path for the carry bit is not shown). The adder unit 321 then outputs 16-bit data of the addition result to the register file unit 2 as 16-bit data Do2 through the second switch unit 325. In accordance with the control signal Ctl2, the second switch unit 325 controls the output from the adder unit 321 to be provided to the register file unit 2.

The register file unit 2 stores the received 16-bit data Do2 into a predetermined register. A carry bit resulting from the addition in the adder unit 321 is also output to the register file unit 2 and is stored into a predetermined register (e.g., a carry register). A data path for the carry bit is not shown.

In cycle 4, the instruction control unit 1 provides a multiplication instruction based on the control signal Ctl2 to the instruction execution unit 3. This instruction activates the multiplier unit 333 in the third slot 33. Subsequently, the same processing as performed in cycle 2 by the multiplier unit 333 in the third slot 33 is performed. In other words, the multiplication (multiplication by the multiplier unit 333 in the third slot) is performed on other data in the same manner as described above. The data for this multiplication is read from the data memory M2 by the load-store unit 311 in the first slot 31 and is stored into a predetermined register of the register file unit 2 in cycles 2 and 3.

As described above, the VLIW processor 1000 multiplies two 16-bit data sets together, and adds the 32-bit data resulting from the multiplication to other 32-bit data (MulAdd processing).

1.2.3 MulShiftAdd Processing

The VLIW processor 1000 multiplies two 16-bit data sets together, performs arithmetic shifting of the resultant 32-bit data, and adds the arithmetic shifting result to other 32-bit data (MulShiftAnd processing). This processing will now be described with reference to FIGS. 8 and 9. An example of the MulShiftAdd processing is cumulative addition of the multiplication result of two 16-bit data sets performed after their fixed decimal point positions are aligned. Such processing is commonly used in image processing, image recognition, and other processing.

Figure 8:
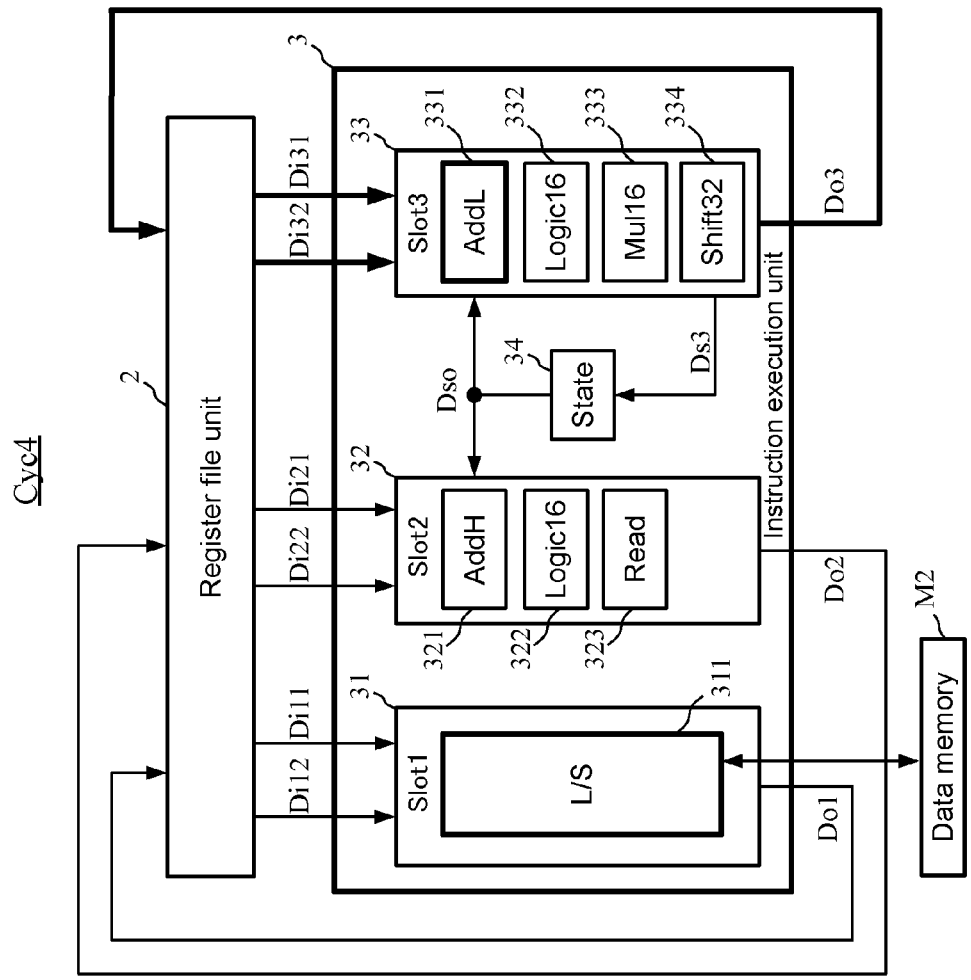
FIG. 8 is a diagram showing arithmetic processing allocated to each slot in MulShiftAdd processing, in which active elements of the VLIW processor 1000 in cycle 4 are emphasized.

The left portion of FIG. 8 shows arithmetic processing allocated to the slots (the first slot 31, the second slot 32, and the third slot 33) in each cycle of the MulShiftAdd processing performed by the VLIW processor 1000. In the right portion of FIG. 8, active elements in cycle 4 (Cyc4) are emphasized.

Figure 9:
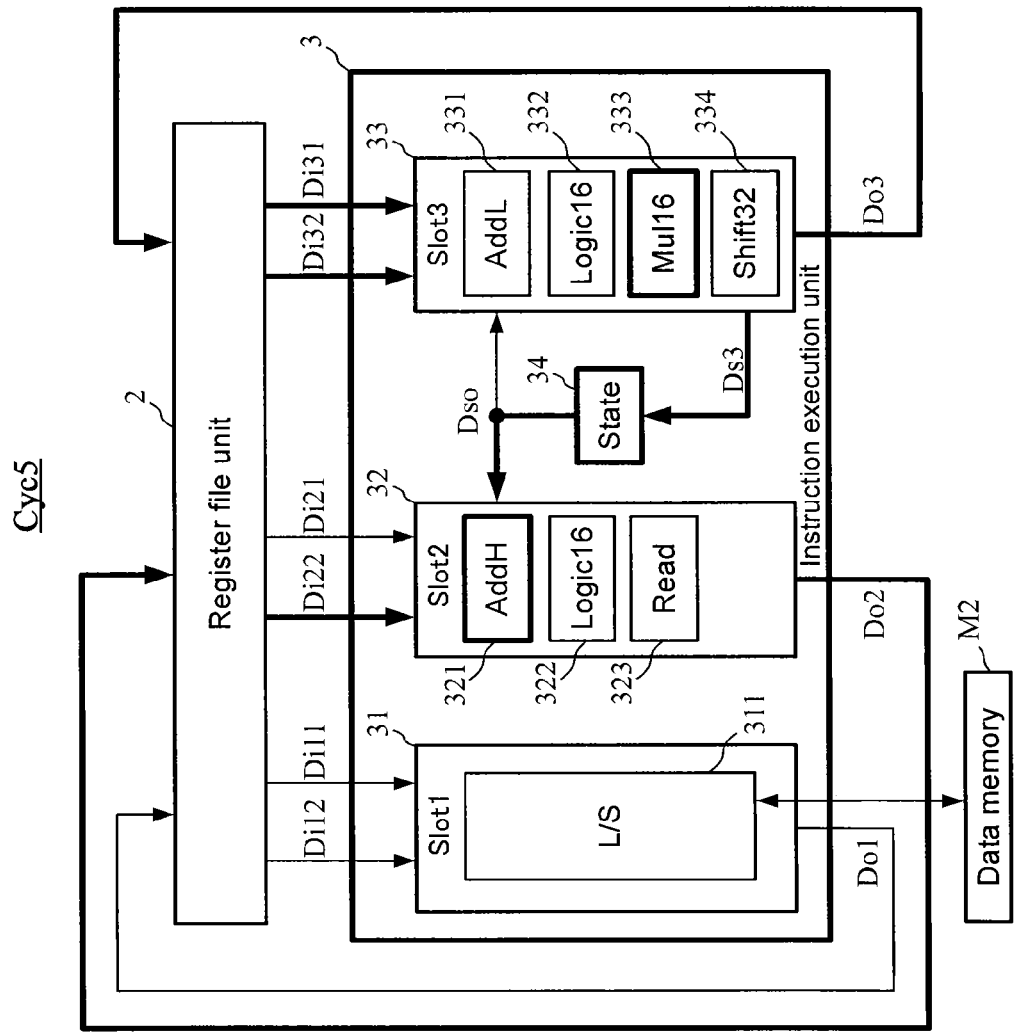
FIG. 9 is a diagram showing arithmetic processing allocated to each slot in MulShiftAdd processing, in which active elements of the VLIW processor 1000 in cycle 5 are emphasized.

FIG. 9 is basically the same as FIG. 8.

In the right portion of FIG. 9, active elements in cycle 5 (Cyc5) are emphasized.

Cyc0 to Cyc3:

The processing in cycles 0 to 3 (Cyc0 to Cyc3) is the same as the processing in cycles 0 to 3 described above in "1.2.1 MulShift processing", and will not be described in detail.

Cyc4:

In cycle 4 (Cyc4), the instruction control unit 1 provides an addition instruction (AddL instruction) based on the control signal Ctl2 to the instruction execution unit 3. This instruction activates the adder unit 331 in the third slot 33. In accordance with the control signal Ctl2 from the instruction control unit 1, the register file unit 2 also outputs the lower 16-bit data of the arithmetic shifting result stored in the predetermined register in cycle 3 to the third slot 33 through the data path Di31. In accordance with the control signal Ctl2 from the instruction control unit 1, the register file unit 2 outputs the lower 16-bit data of 32-bit data to be added (e.g., a cumulative addition value, which is 32-bit data) to the third slot 33 through the data path Di32.

The adder unit 331 in the third slot 33 adds up the two 16-bit data sets input through the data paths Di31 and Di32. The adder unit 331 then outputs 16-bit data of the addition result to the register file unit 2 as 16-bit data Do3. The register file unit 2 stores the received 16-bit data Do3 into a predetermined register. A carry bit resulting from the addition in the adder unit 331 is also output to the register file unit 2 and is stored into a predetermined register (e.g., a carry register). A data path for the carry bit is not shown.

Cyc5:

In cycle 5 (Cyc5), the instruction control unit 1 provides an addition instruction (AddH instruction) based on the control signal Ctl2 to the instruction execution unit 3. This instruction activates the adder unit 321 in the second slot 32. In accordance with the control signal Ctl2 from the instruction control unit 1, the register file unit 2 also outputs the upper 16-bit data of 32-bit data to be added (e.g., a cumulative addition value, which is 32-bit data) to the second slot 32 through the data path Di22.

The state register 34 outputs the arithmetic shifting result stored in cycle 3 (the upper 16-bit data of the arithmetic shifting result obtained by the arithmetic shifting unit 334) to the adder unit 321 through the first switch unit 324. In accordance with the control signal Ctl2, the first switch unit 324 controls the output from the state register 34 to be provided to the adder unit 321.

The adder unit 321 in the second slot 32 adds up the 16-bit data input through the data path Di22, the 16-bit data output from the first switch unit 324 (the upper 16-bit data of the arithmetic shifting result obtained by the arithmetic shifting unit 334), and the carry bit resulting from the addition in the adder unit 331 (the data path for the carry bit is not shown). The adder unit 321 outputs 16-bit data of the addition result to the register file unit 2 as 16-bit data Do2 through the second switch unit 325. In accordance with the control signal Ctl2, the second switch unit 325 controls the output from the adder unit 321 to be provided to the register file unit 2.

The register file unit 2 stores the received 16-bit data Do2 into a predetermined register. A carry bit resulting from the addition in the adder unit 321 is also output to the register file unit 2 and stored into a predetermined register (e.g., a carry register). A data path for the carry bit is not shown.

In cycle 5, the instruction control unit 1 provides a multiplication instruction based on the control signal Ctl2 to the instruction execution unit 3. This instruction activates the multiplier unit 333 in the third slot 33. Subsequently, the same processing as performed in cycle 2 by the multiplier unit 333 in the third slot 33 is performed. In other words, the multiplication (multiplication by the multiplier unit 333 in the third slot) is performed on other data in the same manner as described above. The data for this multiplication is read from the data memory M2 by the load-store unit 311 in the first slot 31 and is stored into a predetermined register of the register file unit 2 in cycles 3 and 4.

As described above, the VLIW processor 1000 multiplies two 16-bit data sets together, performs arithmetic shifting of the 32-bit data resulting from the multiplication, and adds the resultant data to other 32-bit data (MulShiftAdd processing).

1.2.4 ShiftAdd Processing

The VLIW processor 1000 performs arithmetic shifting of 32-bit data and adds the resultant 32-bit data to other 32-bit data (ShiftAdd processing). This processing will now be described with reference to FIGS. 10 to 12. An example of the ShiftAdd processing is cumulative addition with the aligned fixed decimal point positions. Such processing is commonly used in image processing, image recognition, and other processing.

Figure 10:
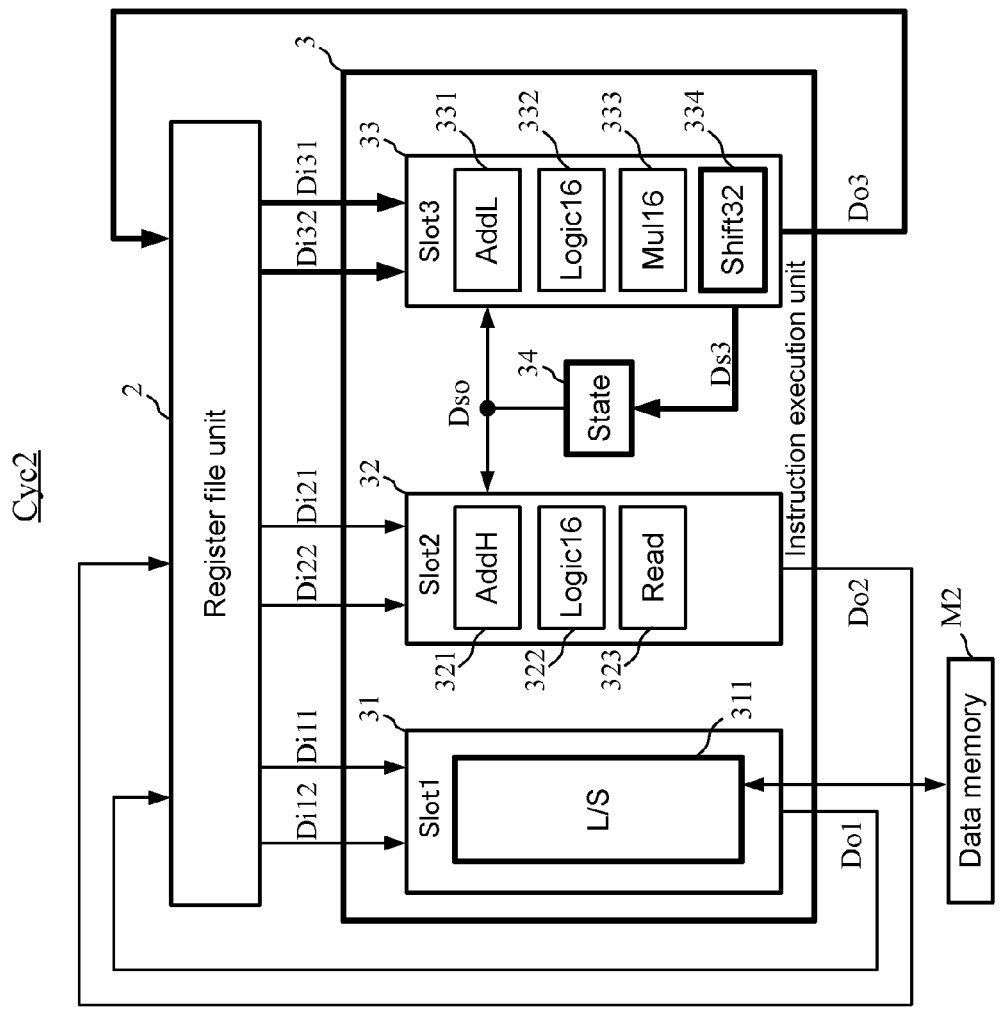
FIG. 10 is a diagram showing arithmetic processing allocated to each slot in ShiftAdd processing, in which active elements of the VLIW processor 1000 in cycle 2 are emphasized.

The left portion of FIG. 10 shows arithmetic processing allocated to the slots (the first slot 31, the second slot 32, and the third slot 33) in each cycle in the ShiftAdd processing performed by the VLIW processor 1000. In the right portion of FIG. 10, active elements in cycle 2 (Cyc2) are emphasized.

Figure 11:
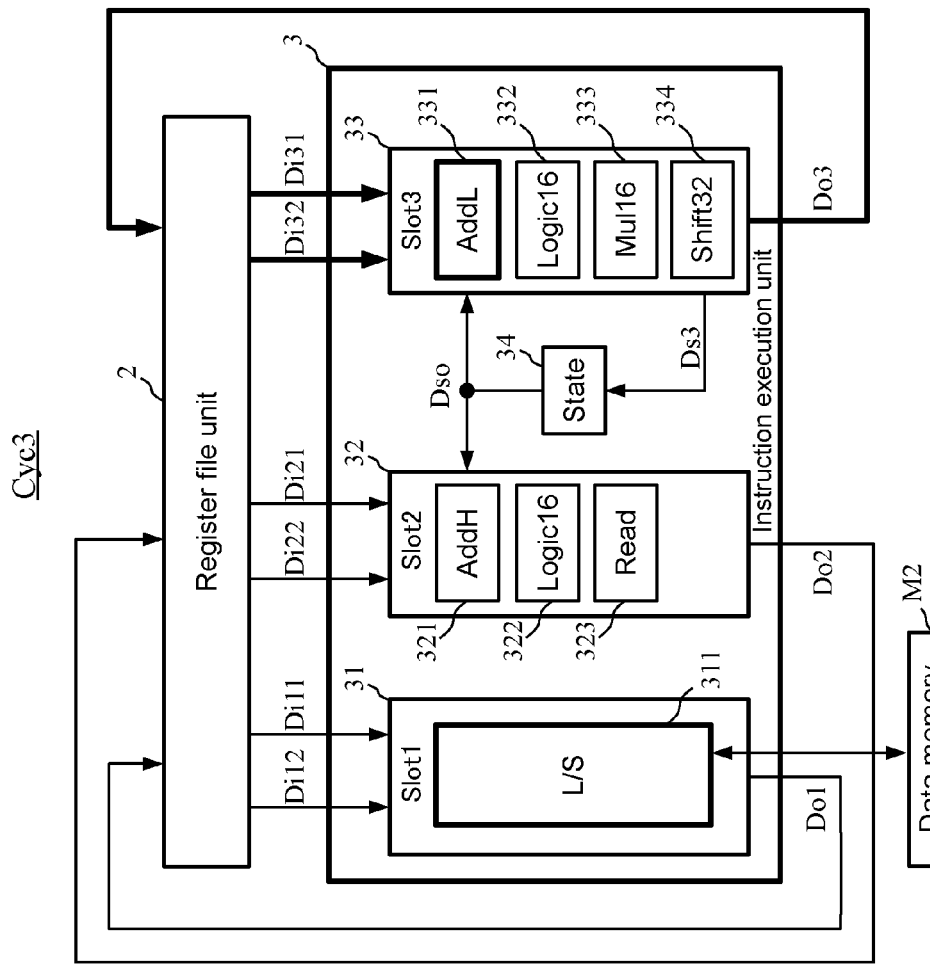
FIG. 11 is a diagram showing arithmetic processing allocated to each slot in ShiftAdd processing, in which active elements of the VLIW processor 1000 in cycle 3 are emphasized.
Figure 12:
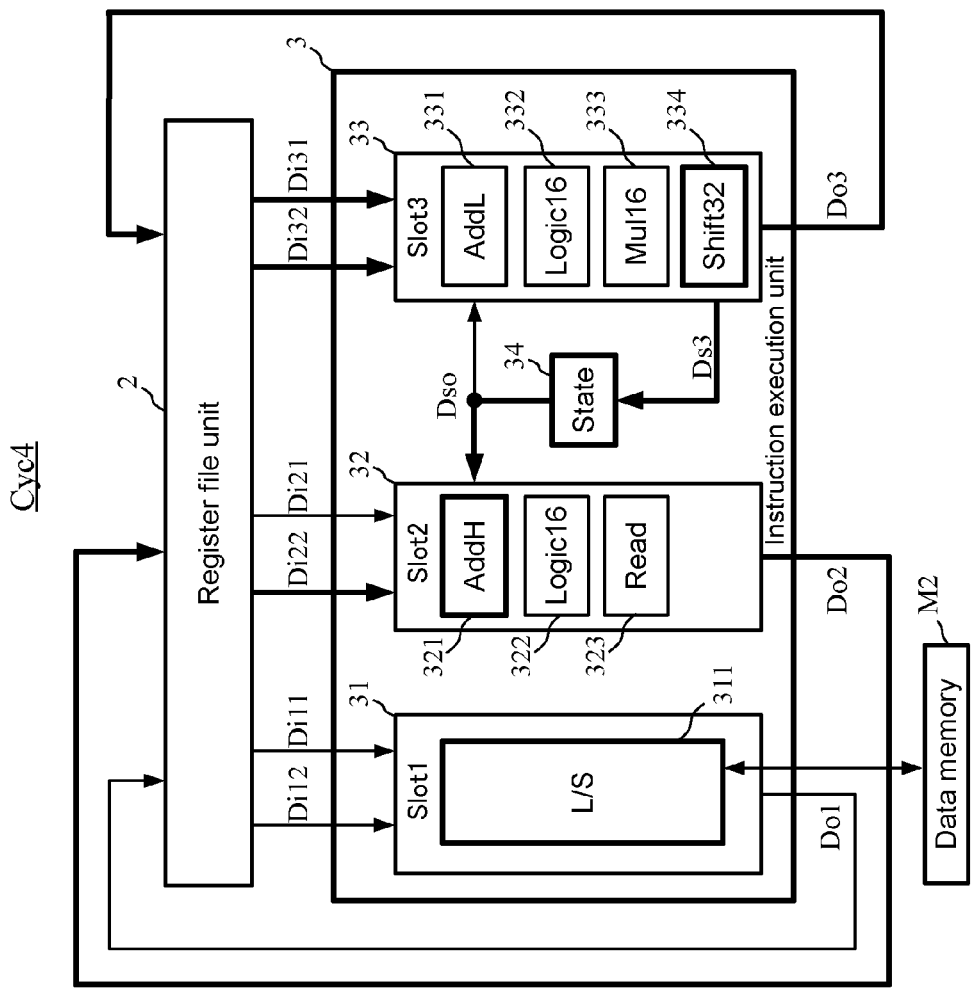
FIG. 12 is a diagram showing arithmetic processing allocated to each slot in ShiftAdd processing, in which active elements of the VLIW processor 1000 in cycle 4 are emphasized.
Figure 13:
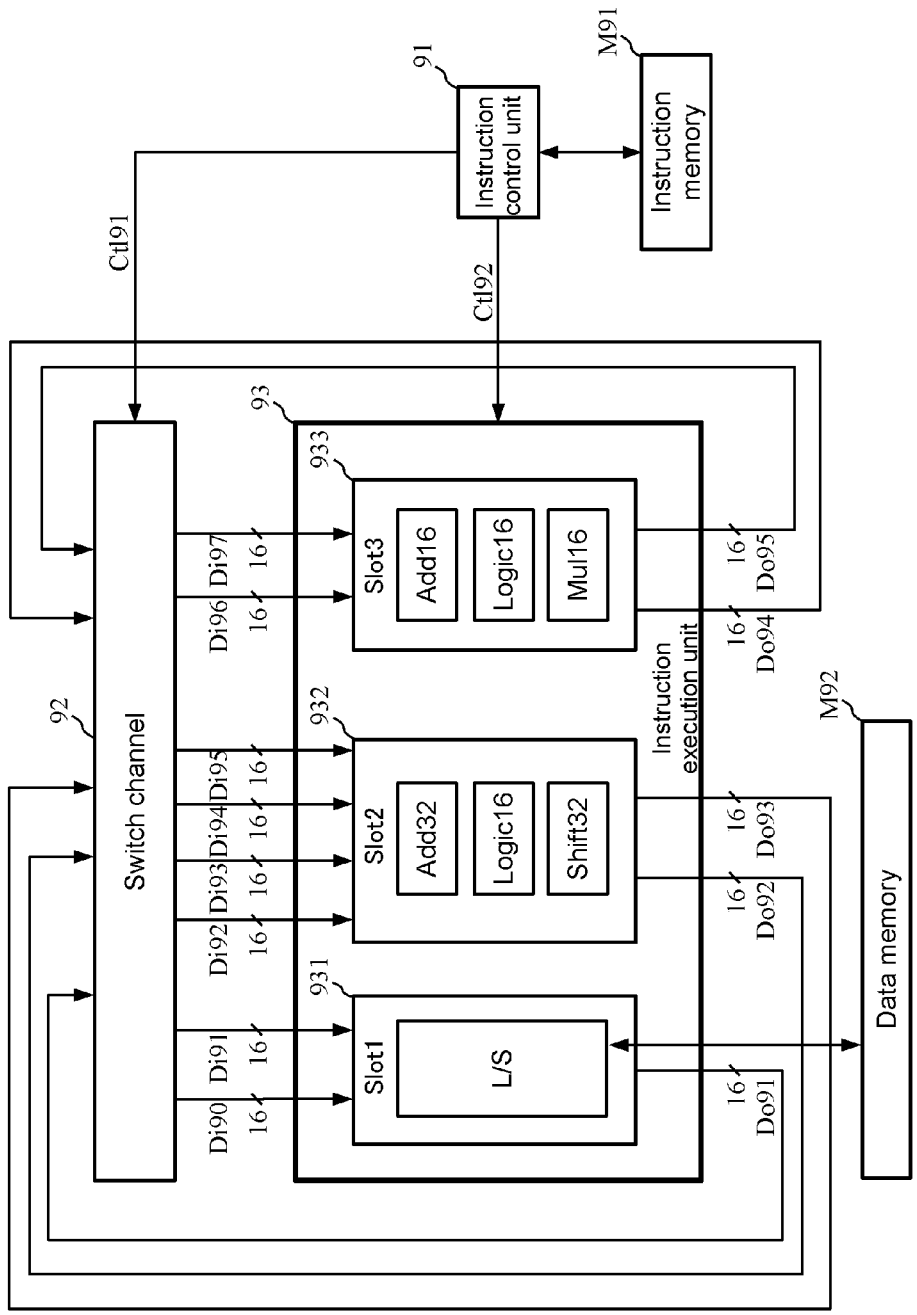
FIG. 13 is a schematic block diagram of a processor 900 with a technique known in the art capable of performing 32-bit operations.

FIGS. 11 and 12 are basically the same as FIG. 10.

In the right portion of FIG. 11, active elements in cycle 3 (Cyc3) are emphasized.

In the right portion of FIG. 12, active elements in cycle 4 (Cyc4) are emphasized.

Cyc0 to Cyc1:

The processing in cycles 0 to 1 (Cyc0 to Cyc1) is the same as the processing in cycles 0 to 1 described above in "1.2.1 MulShift processing", and will not be described in detail.

Cyc2:

In cycle 2 (Cyc2), the instruction control unit 1 provides an arithmetic shifting instruction (Shift32 instruction) based on the control signal Ctl2 to the instruction execution unit 3. This instruction activates the arithmetic shifting unit 334 in the third slot 33. In accordance with the control signal Ctl2 from the instruction control unit 1, the register file unit 2 also outputs the operation target lower 16-bit data of the 32-bit data stored in the predetermined register in cycles 0 and 1 through the data path Di31 and the upper 16-bit data of the 32-bit data to the third slot 33 through the data path Di32.

The arithmetic shifting unit 334 in the third slot 33 performs arithmetic shifting of two 16-bit data sets, which are the 16-bit data input through the data path Di31 and the 16-bit data input through the data path Di32 and the third switch unit 335. The arithmetic shifting unit 334 outputs the upper 16-bit data of the 32-bit data resulting from the arithmetic shifting to the state register 34 as 16-bit data Ds3 through the fifth switch unit 337.

The state register 34 stores the received 16-bit data Ds3.

The arithmetic shifting unit 334 also outputs the lower 16-bit data of the 32-bit data resulting from the arithmetic shifting to the register file unit 2 as 16-bit data Do3 through the fourth switch unit 336. The register file unit 2 stores the received 16-bit data Do3 into a predetermined register.

Cyc3:

In cycle 3 (Cyc3), the instruction control unit 1 provides an addition instruction (AddL instruction) based on the control signal Ctl2 to the instruction execution unit 3. This instruction activates the adder unit 331 in the third slot 33. In accordance with the control signal Ctl2 from the instruction control unit 1, the register file unit 2 also outputs the lower 16-bit data of the arithmetic shifting result stored in the predetermined register in cycle 2 to the third slot 33 through the data path Di31. In accordance with the control signal Ctl2 from the instruction control unit 1, the register file unit 2 outputs the lower 16-bit data of 32-bit data to be added (e.g., a cumulative addition value, which is 32-bit data) to the third slot 33 through the data path Di32.

The adder unit 331 in the third slot 33 adds up the two 16-bit data sets input through the data paths Di31 and Di32. The adder unit 331 then outputs 16-bit data of the addition result to the register file unit 2 as 16-bit data Do3. The register file unit 2 stores the received 16-bit data Do3 into a predetermined register. A carry bit resulting from the addition in the adder unit 331 is also output to the register file unit 2 and is stored into a predetermined register (e.g., a carry register). A data path for the carry bit is not shown.

Cyc4:

In cycle 4 (Cyc4), the instruction control unit 1 provides an addition instruction (AddH instruction) based on the control signal Ctl2 to the instruction execution unit 3. This instruction activates the adder unit 321 in the second slot 32. In accordance with the control signal Ctl2 from the instruction control unit 1, the register file unit 2 also outputs the upper 16-bit data of 32-bit data to be added (e.g., a cumulative addition value, which is 32-bit data) to the second slot 32 through the data path Di22.

The state register 34 outputs the arithmetic shifting result stored in cycle 2 (the upper 16-bit data of the arithmetic shifting result obtained by the arithmetic shifting unit 334) to the adder unit 321 through the first switch unit 324. In accordance with the control signal Ctl2, the first switch unit 324 controls the output from the state register 34 to be provided to the adder unit 321.

The adder unit 321 in the second slot 32 adds up the 16-bit data input through the data path Di22 and the 16-bit data output from the first switch unit 324 (the upper 16-bit data of the arithmetic shifting result obtained by the arithmetic shifting unit 334). The adder unit 321 outputs 16-bit data of the addition result to the register file unit 2 as 16-bit data Do2 through the second switch unit 325. In accordance with the control signal Ctl2, the second switch unit 325 controls the output from the adder unit 321 to be provided to the register file unit 2.

The register file unit 2 stores the received 16-bit data Do2 into a predetermined register. A carry bit resulting from the addition in the adder unit 321 is also output to the register file unit 2 and is stored into a predetermined register (e.g., a carry register). A data path for the carry bit is not shown.

In cycle 4, the instruction control unit 1 provides an arithmetic shifting instruction (Shift32 instruction) based on the control signal Ctl2 to the instruction execution unit 3. This instruction activates the arithmetic shifting unit 334 in the third slot 33. Subsequently, the same processing as performed in cycle 2 by the arithmetic shifting unit 334 in the third slot 33 is performed. In other words, the arithmetic shifting is performed on other data in the same manner as described above. The data for this arithmetic shifting is read from the data memory M2 by the load-store unit 311 in the first slot 31 and is stored into a predetermined register of the register file unit 2 in cycles 2 and 3.

As described above, the VLIW processor 1000 performs arithmetic shifting of 32-bit data, and adds the resultant 32-bit data to other 32-bit data (ShiftAdd processing).

The VLIW processor 1000 that performs a 32-bit operation to process 32-bit data as described above can store the upper 16-bit data of the 32-bit data into the state register 34, allowing the data to be used by a predetermined arithmetic unit in the next cycle.

In the VLIW processor 1000 as described above, the state register 34 can store the upper 16-bit data of the 32-bit data output from the third slot 33 and can output the data to the second slot 32 or to the third slot 33. The VLIW processor 1000 eliminates the need for outputting the 32-bit data from the third slot 33 to the register file unit 2 and the need for the outputting 32-bit data from the register file unit 2 to the third slot 33. In other word, the VLIW processor 1000 uses 16-bit data to be input and output between the register file unit 2 and the instruction execution unit 3. This eliminates the need for this VLIW processor 1000 to include additional input and output ports between the register file unit 2 and the instruction execution unit 3 compared with processors that perform only 16-bit operations.

The VLIW processor 1000 can support 2×N-bit operations by allocating an N-bit operation (N is a natural number) to each slot without increasing the number of input and output ports of the register file unit 2 as described above.

The VLIW processor 1000 performs efficient processing including extended bits operations, such as processing performed in response to instructions commonly used in image processing, image recognition, and other processing (32-bit operations in the above examples), while preventing scaling up of the circuit.

Other Embodiments

Although the above embodiment describes the case in which the upper 16-bit data of the 32-bit data output from the third slot 33 is output to the state register 34 and the lower 16-bit data of the 32-bit data is output to the register file unit 2, the embodiment should not be limited to this. For example, the VLIW processor 1000 may output the lower 16-bit data of the 32-bit data output from the third slot 33 to the state register 34, and output the upper 16-bit data of the 32-bit data to the register file unit 2.

Although the above embodiment describes the case in which the adder unit 321 in the second slot 32 and the adder unit 331 in the third slot 33 perform addition of 32-bit data, the embodiment should not be limited to this structure. For example, each of the adder unit 321 in the second slot 32 and the adder unit 331 in the third slot 33 may function as an arithmetic processing unit that performs addition of 16-bit data. This allows the VLIW processor 1000 to allocate the addition of 16-bit data to both the second slot 32 and the third slot 33 in the same cycle.

Although the instruction execution unit 3 in the VLIW processor 1000 of the above embodiment includes the three slots, the instruction execution unit may include another number of slots.

Part or all of the above embodiment may be combined.

The processes described in the above embodiment may not be performed in the order specified in the above embodiment. The order in which the processes are performed may be changed without departing from the scope and the spirit of the invention.

The term "unit" herein may include "circuitry," which may be partly or entirely implemented by using either hardware or software, or both hardware and software.

The specific structures described in the above embodiment of the present invention are mere examples, and may be changed and modified variously without departing from the scope and the spirit of the invention.

APPENDIXES

The present invention may also be expressed in the following forms.

A first aspect of the invention provides a VLIW processor including a register file unit and an instruction execution unit.

The instruction execution unit includes a first slot, and a state register that stores data of N bits (N is a natural number).

The first slot includes an input port that receives data of N×2 bits output from the register file unit (N is a natural number), a first output port that outputs data of N bits to the register file unit, and a second output port that outputs data of N bits to the state register. The first slot further includes a first-slot first extended arithmetic unit that performs arithmetic processing using N-bit data and obtains 2×N-bit output data.

The first slot outputs first data that is N-bit data of the 2×N-bit output data obtained by the first-slot first extended arithmetic unit from the first output port to the register file unit, and outputs second data that is N-bit data of the 2×N-bit output data excluding the first data to the state register.

In this VLIW processor, the first slot outputs the 2×N-bit data obtained by the first-slot first extended arithmetic unit to the register file unit and the state register as two N-bit separate data sets. When performing a 2×N-bit operation using 2×N-bit data, this VLIW processor can store N-bit data of the 2×N-bit data into the state register, then allowing a predetermined arithmetic unit to use the N-bit data in the next cycle (clock cycle).

In this VLIW processor, the input port in the first slot, which receives data output from the register file unit, receives data of N×2 bits (N×2-bit input port), and the output port in the first slot, which outputs data to the register file unit, receives data of N bits (N-bit output port). This eliminates the need for the VLIW to include additional input and output ports compared with processors that perform only N-bit operations.

The VLIW processor 1000 can support 2×N-bit operations without increasing the number of input and output ports of the register file unit 2 as described above.

The VLIW processor performs efficient processing including extended bits operations (N×2 bits operations), such as processing performed in response to instructions commonly used in image processing, image recognition, and other processing, while preventing scaling up of the circuit.

A second aspect of the invention provides the VLIW processor of the first aspect of the invention in which the first slot receives the second data that is output from the first slot to the state register and is stored in the state register.

This VLIW processor allows, for example, N-bit data output from the first slot in the cycle immediately preceding the current cycle to be input from the state register to the first slot in the current cycle, and the input data is then used in arithmetic processing performed in the first slot.

A third aspect of the invention provides the VLIW processor of the first aspect of the invention in which the instruction execution unit further includes a second slot.

The second slot includes an input port that receives N×2-bit data output from the register file unit (N is a natural number), an output port that outputs N-bit data to the register file unit, and a second-slot first arithmetic unit that performs arithmetic processing using N-bit data.

The first slot receives the first data that is output from the first slot to the register file unit and is stored in the register file unit.

The state register outputs the second data output from the first slot to the second slot.

This VLIW processor allows, for example, N-bit data output from the first slot in the cycle immediately preceding the current cycle to be input from the state register to the second slot in the current cycle, and the input data is then used in arithmetic processing performed in the second slot.

A fourth aspect of the invention provides the VLIW processor of the third aspect of the invention in which the second slot further includes a read unit that reads N-bit data.

The read unit in the second slot reads data output from the state register and outputs the read data to the register file unit.

In this VLIW processor, the read unit in the second slot can read N-bit data stored in the state register and can output the data to the register file unit at a predetermined timing. When involving an operation using 2×N-bit data, the VLIW processor can efficiently output predetermined data to the register file unit and can store data in the register file unit as needed.

A fifth aspect of the invention provides the VLIW processor of the third or fourth aspect of the invention in which the second slot further includes a second-slot selection unit that selects one of data output from the register file unit and data output from the state register and inputs the selected data into the second-slot first arithmetic unit.

This VLIW processor allows the data output from the register file unit or the data output from the state register unit to be selectively input into the second-slot first arithmetic unit, and thus can input data into the second-slot first arithmetic unit as needed. When, for example, the second-slot first arithmetic unit can perform addition and subtraction, and the arithmetic unit is used to perform addition and subtraction using N-bit data, the first selection unit can receive two N-bit data sets output from the register file unit. When the arithmetic unit performs addition and subtraction using the upper N-bit data in the addition and subtraction using the 2×N-bit data, the state register may store the upper N-bit data of the 2×N-bit data (e.g., N-bit data obtained by the first-slot adder arithmetic unit), and the second-slot selection unit may input the output from the state register into the arithmetic unit. Further, the upper N-bit data of the 2×N-bit data to be added to the above upper N-bit data may be input from the register file unit. This allows the arithmetic unit to perform addition and subtraction using the upper N-bit data in the addition and subtraction using the 2×N-bit data.

A sixth aspect of the invention provides the VLIW processor of the fifth aspect of the invention in which the first slot further includes a first-slot first arithmetic unit that performs arithmetic processing using N-bit data.

The first-slot first extended arithmetic unit is a multiplier unit for the first slot that performs multiplication using two N-bit data sets.

The first data is lower N-bit data of the 2×N-bit data resulting from the multiplication performed by the multiplier unit for the first slot.

The second data is upper N-bit data of the 2×N-bit data resulting from the multiplication performed by the multiplier unit for the first slot.

The first-slot first arithmetic unit is an adder-subtractor unit for the first slot that performs addition and subtraction using two N-bit data sets.

The second-slot first arithmetic unit is an adder-subtractor unit for the second slot that performs addition and subtraction using two N-bit data sets.

The unit that performs multiplication of N bits (multiplier unit) and the unit that performs addition and subtraction of N bits (adder unit for the lower N-bit data) can be allocated to the first unit, and the unit that performs addition and subtraction of N bits (adder unit for the upper N-bit data) can be allocated to the second slot.

A seventh aspect of the invention provides the VLIW processor of the fifth aspect of the invention in which the state register outputs the N-bit data stored therein to the first slot.

The first slot further includes a first-slot second extended arithmetic unit, a first-slot first arithmetic unit, and a first-slot selection unit.

The first-slot second extended arithmetic unit performs arithmetic processing using N-bit data and obtains 2×N-bit output data.

The first-slot first arithmetic unit performs arithmetic processing using N-bit data.

The first-slot selection unit selects one of data output from the register file unit and data output from the state register, and inputs the selected data into the first-slot second extended arithmetic unit.

This VLIW processor allows, for example, N-bit data output from the first slot in the cycle immediately preceding the current cycle to be input from the state register to the first-slot second extended arithmetic unit in the first slot in the current cycle, and the input data is then used in arithmetic processing performed in the first-slot second extended arithmetic unit.

An eighth aspect of the invention provides the VLIW processor of the seventh aspect of the invention in which the first-slot second extended arithmetic unit is a first-slot arithmetic shifting unit that performs arithmetic shifting of two N-bit data sets and obtains 2×N-bit output data.

In this VLIW processor, the first-slot arithmetic shifting unit performs arithmetic shifting using N-bit data output from the state register and N-bit data output from the register file unit.

A ninth aspect of the invention provides the VLIW processor of the eighth aspect of the invention in which the first-slot arithmetic shifting unit performs arithmetic by using data output from the first-slot selection unit as upper N-bit data of data subjected to arithmetic shifting.

In this VLIW processor, the first-slot shift arithmetic unit can perform arithmetic shifting using, for example, N-bit data output from the state register as the upper N-bit data, and uses the N-bit data output from the register file unit as the lower N-bit data.

A tenth aspect of the invention provides the VLIW processor of the sixth aspect of the invention in which the register file unit includes an area for storing a carry flag resulting from the addition and subtraction performed by the adder-subtractor unit for the first slot.

The adder-subtractor unit for the second slot performs addition and subtraction using two N-bit data sets by using the carry flag stored in the register file unit.

In this VLIW processor, the second-slot adder unit can perform addition and subtraction of two N-bit data sets using the carry flag resulting from the addition and subtraction of the first-slot arithmetic unit and stored in the register file unit.

An eleventh aspect of the invention provides the VLIW processor of the sixth aspect of the invention in which the adder-subtractor unit for the second slot performs addition and subtraction using data output from the second-slot selection unit as one of the two N-bit data sets subjected to addition and subtraction.

This enables the second slot to use data stored in the state register, and enables the processor to perform efficient arithmetic processing of N-bit data (e.g., addition and subtraction of N-bit data) and arithmetic processing of 2×N-bit data (extended arithmetic processing, which is for example addition and subtraction of 2×N-bit data).

A twelfth aspect of the invention provides the VLIW processor of any one of the first to eleventh aspects of the invention in which the instruction execution unit further includes a third slot.

The third slot includes an input port that receives data of N×2 bits output from the register file unit (N is a natural number), an output port that outputs data of N bits to the register file unit, and a load-store unit that performs at least one of loading of data from a predetermined memory or storing of data into the predetermined memory.

This achieves a VLIW processor that includes the third slot including the load-store unit.

A thirteenth aspect of the invention provides the VLIW processor of any one of the first to twelfth aspects of the invention in which the first data is lower N-bit data of the 2×N-bit output data obtained by the extended arithmetic unit.

The second data is upper N-bit data of the 2×N-bit output data obtained by the extended arithmetic unit.

This VLIW processor uses the lower N-bit data as the first data (data output to the register file unit), and the upper N-bit data as the second data (data output to the state register), thus performing efficient arithmetic processing.

What is claimed is:

1. A very long instruction word (VLIW) processor, comprising:
   register file circuitry including a plurality of registers; and
   instruction execution circuitry including a first slot, a second slot and a state register, the state register being configured to store data of N bits, N being a natural number;
   the first slot including:
     an input port configured to receive data of N×2 bits output from the register file circuitry,
     a first output port configured to output data of N bits to the register file circuitry,
     a second output port configured to output data of N bits to the state register, and
     first-slot first-extended arithmetic circuitry configured to perform arithmetic processing using N-bit data and obtain 2×N-bit output data,
   the first slot being configured to output first data that is N-bit data of the 2×N-bit output data obtained by the first-slot first-extended arithmetic circuitry from the first output port to the register file circuitry, and output second data that is N-bit data of the 2×N-bit output data excluding the first data to the state register,
   the second slot including:
     an input port configured to receive 2×N-bit data output from the register file circuitry,
     an output port configured to output N-bit data to the register file circuitry that receives only N-bit data from the second slot, and
     second-slot first arithmetic circuitry configured to perform arithmetic processing using N-bit data,
   the first slot receiving, from the register file circuitry, the first data that has been previously output from the first slot to the register file circuitry and has been stored in the register file circuitry, and
   the state register outputting the second data output from the first slot to the second slot.

2. The VLIW processor according to claim 1, wherein the first slot further includes an N-bit input port configured to receive the second data that is output from the first slot to the state register and is stored in the state register.

3. The VLIW processor according to claim 1, wherein:
   the second slot further includes read circuitry configured to read N-bit data, and
   the read circuitry in the second slot reads data output from the state register and outputs the read data to the register file circuitry.

4. The VLIW processor according to claim 1, wherein the second slot further includes second-slot selection circuitry configured to select one of data output from the register file circuitry and data output from the state register and input the selected one of data into the second-slot first arithmetic circuitry.

5. The VLIW processor according to claim 4, wherein:
the first slot further includes first-slot first arithmetic circuitry configured to perform arithmetic processing using N-bit data,
the first-slot first-extended arithmetic circuitry is multiplier circuitry for the first slot configured to perform multiplication using two N-bit data sets,
the first data is lower N-bit data of the 2×N-bit data resulting from the multiplication performed by the multiplier circuitry for the first slot,
the second data is upper N-bit data of the 2×N-bit data resulting from the multiplication performed by the multiplier circuitry for the first slot,
the first-slot first arithmetic circuitry is adder-subtractor circuitry for the first slot configured to perform addition and subtraction using two N-bit data sets for the first-slot first arithmetic circuitry, and
the second-slot first arithmetic circuitry is adder-subtractor circuitry for the second slot configured to perform addition and subtraction using two N-bit data sets for the second-slot first arithmetic circuitry.

6. The VLIW processor according to claim 5, wherein:
the register file circuitry includes an area for storing a carry flag resulting from the adder-subtractor addition and subtraction performed by the adder-subtractor circuitry for the first slot, and
the adder-subtractor circuitry for the second slot performs addition and subtraction using two N-bit data sets by using the carry flag stored in the register file circuitry.

7. The VLIW processor according to claim 5, wherein:
the adder-subtractor circuitry for the second slot performs addition and subtraction using data output from the second-slot selection circuitry as one of the two N-bit data sets for the second-slot first arithmetic circuitry subjected to addition and subtraction.

8. The VLIW processor according to claim 1, wherein:
the state register outputs the N-bit data stored therein to the first slot, and
the first slot further includes:
first-slot second-extended arithmetic circuitry configured to perform arithmetic processing using N-bit data and obtain 2×N-bit output data,
first-slot first arithmetic circuitry configured to perform arithmetic processing using N-bit data, and
first-slot selection circuitry configured to select one of data output from the register file circuitry and data output from the state register, and input the selected one of data into the first-slot second-extended arithmetic circuitry.

9. The VLIW processor according to claim 8, wherein:
the first-slot second-extended arithmetic circuitry is first-slot arithmetic shifting circuitry configured to perform arithmetic shifting of two N-bit data sets and obtain 2×N-bit output data.

10. The VLIW processor according to claim 9, wherein:
the first-slot arithmetic shifting circuitry performs arithmetic shifting by using data output from the first-slot selection circuitry as upper N-bit data of data subjected to arithmetic shifting.

11. The VLIW processor according to claim 1, wherein the instruction execution circuitry further includes
a third slot including:
an input port configured to receive data of 2×N bits output from the register file circuitry,
an output port configured to output data of N bits to the register file circuitry, and
load-store circuitry configured to perform at least one of loading of data from a predetermined memory and storing of data into the predetermined memory.

12. The VLIW processor according to claim 1, wherein:
the first data is lower N-bit data of the 2×N-bit output data obtained by the first-slot first-extended arithmetic circuitry, and
the second data is upper N-bit data of the 2×N-bit output data obtained by the first-slot first-extended arithmetic circuitry.

\* \* \* \* \*